Oct. 21, 1969   A. L. STINGL   3,473,232

VTOL AIRCRAFT FLIGHT SYSTEM

Filed April 7, 1967

INVENTOR

A. L. STINGL

ATTORNEYS

United States Patent Office 3,473,232
Patented Oct. 21, 1969

3,473,232
VTOL AIRCRAFT FLIGHT SYSTEM
Alfred Leroy Stingl, Washington, D.C., assignor to Trans-Meridian International, Inc., Washington, D.C., a corporation of the District of Columbia
Continuation-in-part of application Ser. No. 625,243, Mar. 22, 1967. This application Apr. 7, 1967, Ser. No. 629,191
Int. Cl. G01c 19/34
U.S. Cl. 33—204          5 Claims

ABSTRACT OF THE DISCLOSURE

System for assisting the flight of a helicopter or other vertical take-off and landing (VTOL) aircraft relative to a ship at sea, as in take-off from landing on, or hovering above the ship during transfer of cargo and/or passengers. System comprises a generally T-form structure stabilized by suitable means so that the crossbar of the T-form device is stabilized in a substantially horizontal position despite roll of the ship. The vertical and horizontal elements of the T-form device are further provided with indicia visible to the pilot of the VTOL aircraft when he is in proper position above the ship. Additional means are carried on the T-form device for screening portions of the indicia from the sight of the pilot when the aircraft is not in optimum position. The means for screening the visible indicia from the pilot's view when the aircraft is in certain positions relative to the point of intersection of the crosspiece and vertical elements of the T-form device may comprise flanges extending toward the pilot and separating the indicia one from the others.

RELATED APPLICATIONS

This is a continuation-in-part application based upon an application Ser. No. 625,243, filed on Mar. 22, 1967, in the name of A. L. Stingl for "VTOL Aircraft Flight System."

BACKGROUND OF THE INVENTION

Field of the invention

The present invention relates to a system for aiding a pilot in flying a VTOL aircraft relative to a ship at sea to facilitate hovering and landing or take-off operations.

Discussion of the prior art

As is well known, ships at sea are more and more being serviced by aircraft, especially VTOL aircraft, such as helicopters. Helicopters are employed to transfer personnel, mail and cargo. In many cases the helicopters are also carried aboard naval vessels and are used for anti-submarine warfare and reconnaissance. In conducting transfer operations and in landing on ships at sea, the pilot of the helicopter must hover above a portion of the ship's deck. To accomplish the operation, efficiently and safety, it is desirable that the pilot hover the aircraft in a substantially horizontal attitude. Maintaining the proper horizontal attitude has, however, proved to be extremely difficult due to the roll of the ship and the absence of suitable visual reference for the pilot. Due to the proximity of the ship, he cannot safely take his eyes off the ship to refer to instruments in the cockpit.

It has, therefore, been the practice of helicopter pilots under such circumstances to pick out a portion of the ship's structure and try to maintain the aircraft in the proper attitude by reference to that external point. However, this has proved to be highly unsatisfactory and in fact dangerous, especially in high seas, due to the movement of the ship's superstructure in response to pitch and roll.

In the above-identified patent application of which the present application is a continuation-in-part, a flight system was disclosed to aid the pilot of a VTOL aircraft in flying relative to a ship at sea. The disclosed system provided a horizontally stabilized reference bar mounted on a portion of the ship's structure which would be conveniently viewed by the pilot while attempting to maintain the position of the aircraft relative to the ship. While the disclosed system enabled the pilot satisfactorily to maintain a generally horizontal attitude, regardless of the roll of the ship, it does not provide a convenient reference for positioning of the aircraft with reference to a fixed point above the ship's deck. Especially in night flying, it is difficult for a pilot to determine absolute position relative to the horizontal reference bar despite the fact that the bar might be illuminated or painted with a phosphorescent material.

Therefore, the present invention has been provided to enable a pilot not only to maintain a substantially horizontal attitude, despite rolling of the ship, but also to maintain a substantially fixed position above the ship in terms of both altitude and lateral positioning.

SUMMARY OF THE INVENTION

According to the present invention, a pilot is enabled to fly a VTOL aircraft in a substantially horizontal attitude above a ship at sea and also is enabled to maintain a fixed position above the ship in terms of altitude and lateral position. This is accomplished by providing a generally T-form device on a portion of the ship's structure which is readily viewable by the pilot during landing or hovering operation. The position of the vertical element of the T-form device is controlled by suitable means, preferably a gyro, amplifier motor and gear arrangement as shown in the parent application and discussed more fully hereinafter. By adjusting the angle of the vertical element to compensate for the roll of the ship, the crosspiece of the T-form device is maintained in a substantially horizontal position. Indicia visible to the pilot are placed on both the horizontal crosspiece and the vertical element of the T-form device. The indicia may be in the form of lights, colored markings or the like. Flanges are then provided at the point of intersection of the crosspiece and the vertical element and extending out from the crosspiece and the vertical element in the direction of the pilot. The flanges are preferably substantially normal to the plane of the T-form device and separate the indicia on the right-hand side of the crosspiece element from the indicia on the left-hand side and also separate indicia on the crosspiece from indicia on the vertical element of the T-form device. The flanges are arranged relative to the indicia on the crosspiece and vertical element so that when the aircraft is positioned substantially to the left of the point of intersection of the crosspiece and vertical element, at least a portion of the indicia on the right side of the crosspiece is screened from view. Similarly when the aircraft is positioned substantially to the right of the point of intersection, at least a portion of the indicia on the left-hand side of the crosspiece is screened from view. In like manner, if the aircraft is positioned too low relative to the point of intersection, at least a portion of the indicia carried on the crosspiece, on either the left-hand side or the right-hand side or both will be screened from the pilot's view and if the aircraft is too high, relative to the reference point, at least a portion of the indicia on the vertical element of the T-form device is screened from the pilot's view.

Thus, by flying the VTOL aircraft relative to the horizontal reference bar and so that all of the indicia on the crosspiece and vertical element are within his view, the pilot maintains a substantially horizontal attitude and also maintains an appropriate altitude and lateral positioning above the deck of the ship.

DESCRIPTION OF PREFERRED EMBODIMENT OF THE INVENTION

In the preferred embodiment of the invention the T-form device is mounted on a portion of the ship's deck, as was described in the copending parent application referred to above. Generally the mounting consists of a platform to which the vertical element of the T-form device is rigidly attached in a substantially perpendicular position. The platform is pivotable about an axis positioned beneath the vertical element. As the platform is pivoted about this axis the vertical element may be moved to the right or left, responsive to the roll of the ship, thereby maintaining the crosspiece in a substantially horizontal position. A gyro or other gravity control means capable of generating an electric signal in response to roll of the ship is coupled with an amplifier which is used to control the direction of an electric motor. The motor, in turn, is connected with suitable gearing means associated with the platform to control the horizontal position of the crosspiece, despite the roll of the ship. This means for maintaining the platform and the crosspiece of the T-form in horizontal position is shown schematically as a box 20 in FIGURE 1 and is identical with the device shown in applicant's copending application Ser. No. 625,-243, mentioned above.

Figure 1:
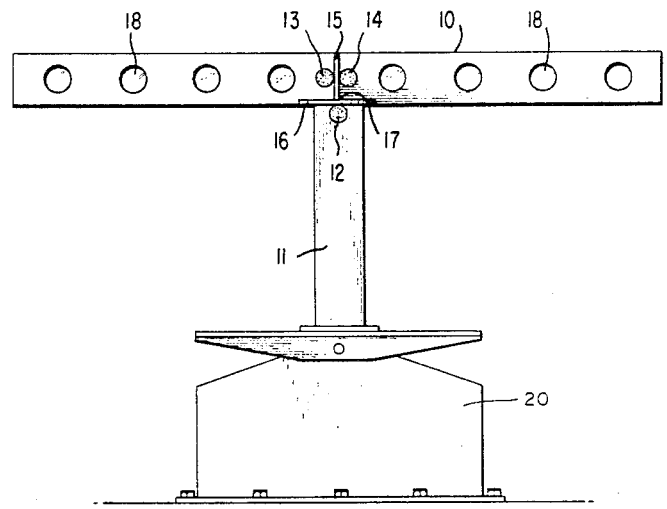
FIG. 1 is a front view of the T-form device, bearing indicia and flange structure in accordance with the present invention.

As shown in FIG. 1 of the drawing, the vertical element 11 of the T-form device is provided with indicia 12 adjacent to the point of intersection of the vertical element with the crosspiece 10. Indicia 13 and 14 are located on the left-hand and right-hand sides respectively of the point of intersection between the two elements.

Flanges 15 and 16 extend out from the point of intersection 17 and separate indicia 12, 13 and 14, one from the others.

The flanges preferably lie in planes which are substantially normal to the plane of the T-form device. The dimensions of the flanges are not critical, but the flanges should extend a sufficient distance in the direction of the pilot so that when the aircraft is substantially to the left or right or above or below its optimum position, at least a portion of the indicia adjacent to the point of intersection is obscured from the pilot's view.

Figure 2:
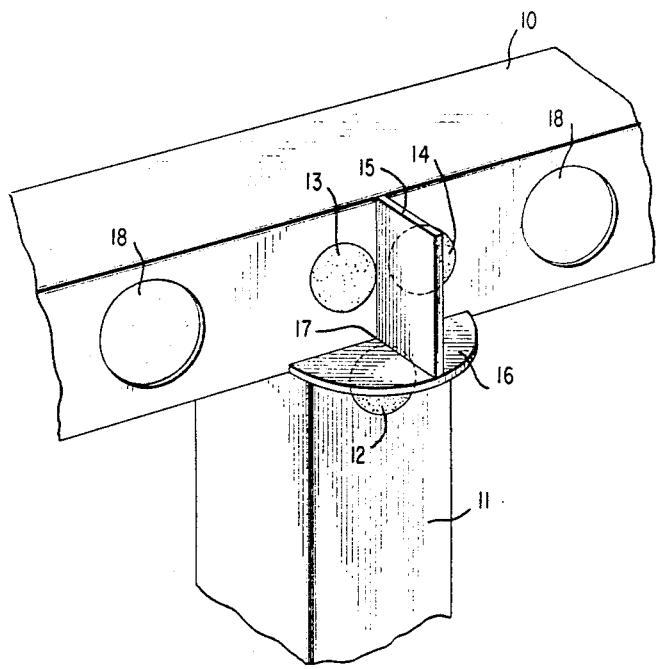
FIG. 2 is a perspective view of the same device from a high left angle showing the manner in which portions of the indicia on the crosspiece and vertical element of the T-form device are obscured when the aircraft is not in the optimum position.

This will be seen more clearly by referring to FIG. 2 which is a perspective of the T-form device viewed from a high left angle. As will be seen, when the pilot of the VTOL aircraft views the T-form device at this angle, a portion of the indicia 14 obscured by flange 15, indicating to the pilot that he is flying to the left of optimum position for the aircraft. Likewise, a portion of indicia 12 is obscured by flange 16 indicating that the aircraft is positioned above the optimum location. It will be obvious that, if the angle of view in FIG. 2 were higher and farther to the left, indicia 12 and 14 would be completely obscured by the flanges. Therefore, when the pilot sees that the aircraft is out of optimum position, he adjusts the position of the aircraft so that the respective indicia 12, 13 and 14 are all fully in view. Such adjustments in position are made while continuing to maintain the aircraft in a substantially horizontal attitude as dictated by the attitude of the crosspiece 10.

Very satisfactory indicia for purposes of the present invention are provided by multi-colored lights. For example, indicia 12, 13 and 14 may be provided by amber, red and green colored lights, respectively. The crosspiece and/or vertical element may also be provided with additional lights 18 which conveniently may be blue or another color not confusingly similar to the indicia lights.

What is claimed is:

1. A system for assisting the flying of vertical takeoff and landing aircraft relative to a ship at sea, comprising
 a T-form device mounted on said ship in view of the pilot of said aircraft,
 means for maintaining the crosspiece of said T-form device in a substantially horizontal position, so that said pilot may fly said aircraft in a substantially horizontal attitude by reference to said crosspiece, irrespective of the position of the ship,
 indicia on the right and left-hand sides of said crosspiece and on the vertical element of said T-form device, all of which are visible to said pilot when said aircraft is in optimum position, and
 means for screening at least a portion of at least one of said indicia from the view of said pilot when said aircraft is substantially removed from the optimum position above said ship.

2. The flight aid system of claim 1 wherein said screening means are flanges which extend towards said pilot substantially normal to the plane of said T-form device and which separate said indicia, one from the others.

3. The flight aid system of claim 1 wherein said indicia comprise at least one light on the right-hand side of said crosspiece, one light on the left-hand side of said crosspiece and one light on said vertical element.

4. The flight aid system of claim 1 wherein said lights are of different colors.

5. The flight aid system of claim 2 wherein said flanges include a flange extending along a substantially vertical plane from a point substantially in the middle of said crosspiece and a flange extending along a substantially horizontal plane from the intersection between said crosspiece and said vertical element of said T-form device.

References Cited

UNITED STATES PATENTS

| | | |
|---|---|---|
| 405,058 | 6/1889 | Thompson. |
| 2,268,758 | 1/1942 | Martin. |
| 3,091,751 | 5/1963 | Greenberg. |
| 3,138,779 | 6/1964 | Murray et al. |
| 3,279,406 | 10/1966 | Ricketts et al. |

WILLIAM D. MARTIN, JR., Primary Examiner

U.S. Cl. X.R.

33—46, 74; 114—43.5; 116—124